June 30, 1959 W. EILERS 2,892,975

VOLTAGE-COMPENSATED SELF BIASED MAGNETIC AMPLIFIER

Filed Dec. 24, 1956

INVENTOR.
WALTER EILERS
BY Darby & Darby
ATTORNEYS 2,892,975
Patented June 30, 1959

2,892,975

VOLTAGE-COMPENSATED SELF BIASED MAGNETIC AMPLIFIER

Walter Eilers, Washington, D.C., assignor to Emerson Radio & Phonograph Corporation, Jersey City, N.J., a corporation of New York Application December 24, 1956, Serial No. 630,391

3 Claims. (Cl. 323—89)

The present invention relates to magnetic amplifiers having self-contained means for supplying regulated voltage to the bias winding of the amplifier and more particularly to such amplifiers in which the bias winding current is automatically varied to compensate for power supply voltage variations.

Magnetic amplifiers are commonly used in electronic computers, and hence must have relative stable transfer characteristics in order to provide a high degree of accuracy in the computer.

In magnetic amplifiers the power gain property of saturable magnetic cores is utilized to control a large average direct current output with a small expenditure of input power. The output power obtained from the magnetic amplifier power supply may be controlled by an input of small power so that a large power gain is achieved.

The magnetic amplifier output is controlled by gate windings in the output circuit which are wound around saturable magnetic cores. The impedance of the gate windings is high when the cores are unsaturated and thus little output current flows. When the cores are saturated, however, the inductance effect in the gate windings is greatly reduced so that the gate winding impedances are very low and a high output current may flow. The output of the amplifier is normally rectified to produce a direct current or fluctuating direct current output.

A control current winding is provided to control the flux in the cores in accordance with an input signal. Thus the condition of saturation of the cores and hence the output current may be controlled by the current in the control winding.

In addition to the control winding, a bias winding and a feedback winding are also usually provided to achieve the desired transfer function for the amplifier. It has also been customary to include a voltage compensation winding where precision of control is required.

The present invention provides a magnetic amplifier having a particularly stable transfer characteristic in the presence of power supply voltage variations and is thus particularly adapted for use in computer applications. In addition, magnetic amplifiers according to the present invention are of simpler and less expensive construction. This is also an important consideration in computer applications where it may be necessary to use a large number of such amplifiers. The present invention relates particularly to the bias and voltage compensation circuits of a magnetic amplifier.

It is an object of the present invention to provide a magnetic amplifier which does not require a separate winding for voltage compensation, this function being performed by a self-contained bias current circuit.

It is another object of the present invention to provide a magnetic amplifier wherein the bias and voltage compensation functions are combined in a single winding. In a specific form of the invention the current in this single winding is regulated by a Zener diode.

It is a further object of the present invention to provide a voltage-compensated magnetic amplifier having fewer windings and precision resistances so that a particularly simple, inexpensive and reliable amplifier is provided.

Other objects and advantages will be apparent from a consideration of the following description in conjunction with the appended drawings, in which Fig. 1 is a schematic circuit diagram of a magnetic amplifier containing a bias and voltage compensation circuit according to the present invention;

Figure 1:
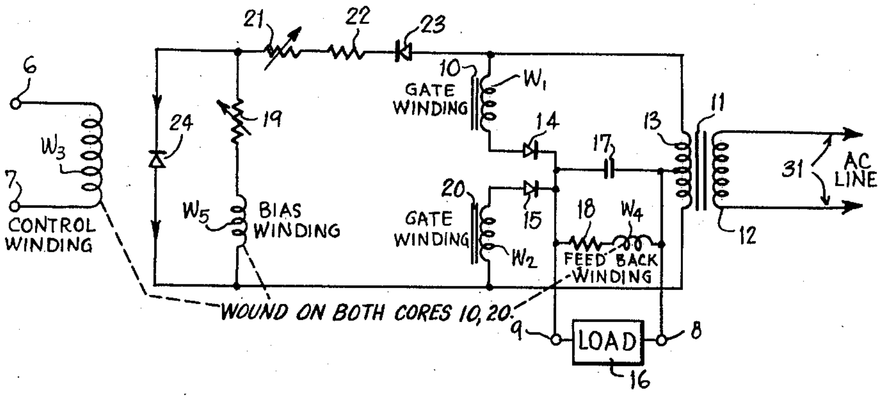

Referring now to the drawings and particularly to Fig. 1, a transformer 11 is shown having a primary winding 12 connected to an alternating current supply line 31. A typical power supply might be 110 volts at 400 cycles per second.

The magnetic amplifier in Fig. 1 is provided with two saturable magnetic cores indicated schematically at 10 and 20. These are generally toroidal or closed cores, as is well known. A gate winding $W_1$ is wound on core 10 and a second gate winding $W_2$ is wound around the core 20. The gate winding $W_1$ is connected in series with a rectifier 14 and the series combination is connected between one terminal of the secondary 13 of the transformer 11 and an output terminal 9. The gate winding $W_2$ is connected in series with a second rectifier 15, this series combination being connected between the other terminal of the transformer secondary 13 and the output terminal 9.

A second output terminal 8 is provided, which is connected to a center tap of the transformer secondary 13. The output circuit or load 16 for the magnetic amplifier is connected between output terminals 8 and 9. A circuit is therefore completed during the positive half of the alternating current cycle through the gate winding $W_1$, the rectifier 14 and the load 16 back to the center tap of the transformer secondary 13. On the negative half of the alternating current cycle a path is provided through the gate winding $W_2$, the rectifier 15 and the load 16. A filter capacitor 17 is connected between the output terminals 8 and 9 to filter the fluctuating direct current signal supplied to the output terminals 8 and 9.

Three other windings $W_3$, $W_4$ and $W_5$ are wound about both the two cores 10 and 20. The currents in the windings $W_3$, $W_4$ and $W_5$ control the fluxes in the cores 10 and 20 and thus control the output at the amplifier output terminals 8 and 9. Winding $W_3$ is a control winding and is connected to input terminals 6 and 7 and thus partially controls the fluxes in the cores 10 and 20 in response to the input current. Winding $W_4$ is a feedback winding and is connected across the output terminals 8 and 9 in series with a feedback-limiting resistor 18. The feedback winding $W_4$ is wound about the cores 10 and 20 in a sense to provide positive feedback and thus greatly increases the gain of the magnetic amplifier to an extent determined by the resistor 18. The winding $W_5$ is a bias winding and is connected across the terminals of the transformer secondary 13 in series with a bias resistor 19, a voltage-compensation resistor 21, a limiting resistor 22 and a rectifier 23. A Zener diode 24 is connected in parallel with the series circuit formed by the bias winding $W_5$ and the bias resistor 19.

The operation of the magnetic amplifier of Fig. 1 will best be understood by considering the function of each of the windings that contribute to its overall operation. Considering first the function of the gate winding $W_1$ and the gate winding $W_2$ apart from the other amplifier windings, the winding $W_1$ and the winding $W_2$ are each wound around a respective saturable magnetic core.

The current in the winding $W_1$ virtually never reverses due to the rectifying effect of the rectifier 14. The current in the winding $W_2$ is also substantially unidirectional. If the flux in the cores 10 and 20 were controlled solely by the windings $W_1$ and $W_2$ respectively, the cores would be saturated by the gate windings and would remain saturated due to the remanence flux in the cores 10 and 20. Due to the unidirectional current flow in each of the gate windings there would be no magnetomotive force applied to the cores tending to desaturate them.

The inductive reactance of the saturated cores is small, approaching that of an air-core coil. Therefore, the output through the terminals 8 and 9 would be high in the foregoing situation due to the low impedance presented by gate windings $W_1$ and $W_2$.

The function of the control winding $W_3$ is to control the flux in the cores 10 and 20 and thus control the output current which flows through the gate windings $W_1$ and $W_2$. The control winding $W_3$ is wound about both cores 10 and 20. The current in the control winding may be made to flow in such a sense that the magnetomotive force generated thereby opposes the flux generated by the gate winding $W_1$ in the core 10 and likewise opposes the flux generated by the gate winding $W_2$ in the core 20.

The control winding $W_3$ therefore applies a magnetomotive force to the core 10 and to the core 20 which tends to desaturate each of these cores from its normally saturated condition produced by the gate windings $W_1$ and $W_2$ and hence reduces the output current. Thus the output current is high when no current flows in the control winding and it may be reduced to a very low value by passing a control current of suitable magnitude in the proper sense through the control winding $W_3$.

It is generally desired that the output current should be low for low values of control current and should increase as the control current increases. This situation does not exist where only the gate windings $W_1$ and $W_2$ and the control winding $W_3$ are provided as explained above. The bias winding $W_5$ is therefore necessary to obtain the desired transfer characteristics for the magnetic amplifier. By utilizing a bias winding $W_5$ it is possible to provide the necessary magnetomotive force from this winding $W_5$ in the cores 10 and 20 to attain an unsaturated condition which will provide minimum output current for zero control winding current. The current in the control winding is then arranged to have an effect opposing the bias winding current to provide high output current for higher values of control current.

Feedback winding $W_4$ may be provided to increase the gain of the magnetic amplifier by returning a portion of the output current to the feedback winding $W_4$ in such a sense that increases in output current tend to cause further increases in output current due to the control effect of the feedback winding $W_4$ and hence positive feedback is provided. By this means very high values of gain can be attained which are particularly desirable in certain applications such as in electronic analogue computers. The five windings described above thus provide a magnetic amplifier transfer characteristic with the desired zero intercept and high gain.

Having considered the general structure and operation of the magnetic amplifier as a whole, the particular features and structure of the bias and voltage compensation circuit will now be described.

Although by necessity the bias and voltage compensation circuit of the present invention is shown and described applied to a particular type of magnetic amplifier it should be understood that the invention may also be applied to others of the many diverse magnetic amplifier circuits which are known and used.

The Zener diode 24 is connected for reverse current flow. As will later be explained in detail, the diode 24 connected in this manner maintains a relatively constant voltage at its terminals for wide variations in current through the diode. A typical Zener voltage for such a diode might be 6 volts, for example. While the voltage at the terminals of the transformer secondary 13 may be 110 volts, for example, the voltage across the terminals of the diode 24 will then be approximately 6 volts. The current flow through the diode 24 will be limited by the limiting resistor 22. The current through the diode 24 will also be limited and controlled by the adjustable voltage-compensation resistor 21. The current in the bias winding $W_5$ will be substantially independently controlled by the variable bias resistor 19.

Figure 2:
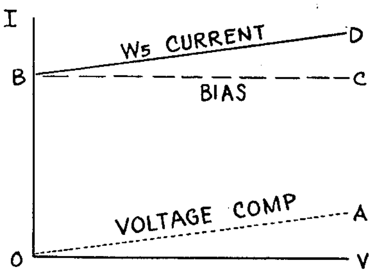
Fig. 2 is a graph of typical average winding current versus supply voltage characteristics useful for showing the way in which the present invention combines the functions of previously used bias and voltage compensation windings.

Previously known magnetic amplifiers incorporating a voltage compensation feature also had an additional winding which was connected across the transformer secondary 13 in series with a resistor. In this way the previously known magnetic amplifiers provided an independent winding having a current controlled by the line voltage which compensated for errors otherwise produced in the magnetic amplifier output as a result of line voltage variations. A change of line voltage would change the current supplied to the load 16, giving an undesired output error; this was compensated by the compensating winding. The functioning of this compensation winding will be apparent from Fig. 2. In Fig. 2 winding current is represented on the vertical axis while the magnetic amplifier power-supply voltage is represented on the horizontal axis. The dotted line OA represents the current voltage characteristic of the voltage compensation winding of a typical magnetic amplifier. It will be seen that this current varies substantially linearly with the line voltage thereby changing the core fluxes to correct for any load current variation. The error introduced by the variations in line voltage is also substantially linear so that the previously known voltage compensation windings provided an adequate compensation for line voltage error.

The bias winding, when properly excited, set the flux level of the cores at the proper operating point for desired results. Previously known amplifier bias windings were supplied with a highly regulated direct voltage to provide a substantially constant current in the bias winding. This requirement for voltage regulation was highly onerous and greatly complicated the apparatus.

In the present invention the bias winding $W_5$ accomplishes both the functions of the bias winding and the voltage compensation winding in previous known magnetic amplifiers, without the complexity of an external highly regulated voltage source. The manner in which this is accomplished is shown in Fig. 2.

The dashed line BC in Fig. 2 represents the current in typical previous magnetic amplifier bias windings. This current was maintained highly constant and did not vary with variations in line voltage. In the present invention, a single winding is provided in which the current is equal to the sum of the current in the bias winding and voltage compensation winding previously used in magnetic amplifiers. The voltage-current characteristic of this winding $W_5$ is indicated by the line BD in Fig. 2.

It should be noted that a change in the current in the bias winding or other auxiliary winding is substantially equivalent to a change in the control winding current and thus due to the high amplification of the amplifier only a small variation is required in such an auxiliary winding to provide sufficient compensation for line voltage variations.

In the present invention two effects combine to produce the necessary variation of bias winding current with line voltage changes required to compensate for line voltage error. The first of these effects will be explained with reference to Fig. 3. It will be noted in Fig. 3 that the voltage supplied to the bias winding in accordance with the present invention is not a constant voltage but is rather a rectified alternating voltage supplied by the rectifier 23. If the line voltage regulation effect of the diode 24 were absolutely constant, the current supply to the bias winding would be clipped or cut-off as indicated by the line JK in Fig. 3. Assuming that the voltage waveform at the transformer secondary 13 were represented by the half sine wave EFG, then the current supplied to the bias winding would have a waveform equivalent to the portion ELMG of the waveform EFG below the line JK as indicated in solid lines in Fig. 3. The average value of this current would be proportional to the area within the waveform ELMG and under the line JK.

Figure 3:
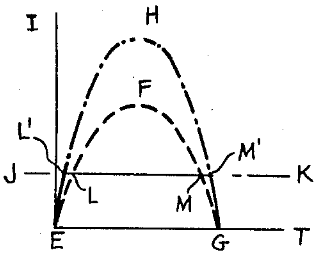
Fig. 3 is a graph of the current versus time relationship in the bias winding circuit.

If the voltage at the transformer secondary 13 increased so that the rectified waveform assumed the shape EHG in Fig. 3, then the waveform of the current and bias winding would be equivalent to that part of the waveform EHG below the line JK, or EL'M'G. The average value of this current would be equivalent to the larger area within the waveform EHG and below the line JK.

The area within the waveform EL'M'G (and hence the average current in the winding) thus increases for increasing line voltages even though the waveform is clipped at the same voltage. The average value of the current in the bias winding is the controlling factor, and this current thus increases with line voltage increases in spite of absolutely constant voltage regulation by the diode 24.

Figure 4:
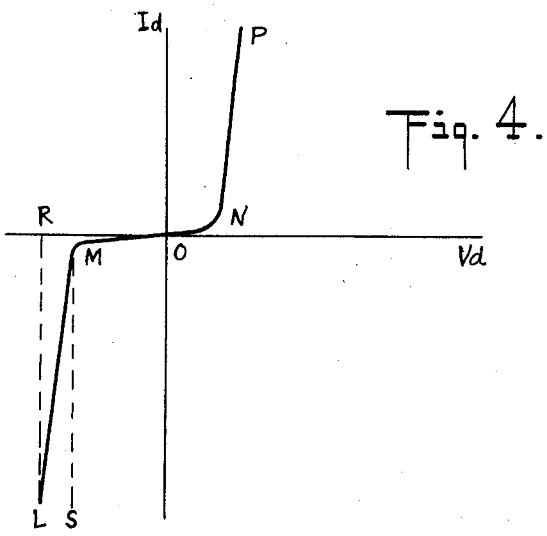
Fig. 4 is a graph of the current voltage characteristic of a typical Zener diode as used in the present invention.

The above explained effect is not the only effect responsible for the voltage compensation in the bias winding $W_5$. In the discussion of Fig. 3 it was assumed that the voltage regulation effect of the diode 24 was absolutely constant. This is not the case. A typical characteristic of a Zener diode is shown in Fig. 4. The current through the diode is represented on the vertical axis and the voltage across the diode is represented on the horizontal axis.

The reverse characteristics of the diode are utilized in the present invention as illustrated in the lower left-hand quadrant of Fig. 4. When a small reverse voltage is applied to the diode, the diode has a very high impedance so that the first negative portion OM of the diode characteristic curve LMONP is quite flat. When the negative voltage reaches a certain value indicated at the point M in Fig. 4, the diode "breaks down" so that a small additional voltage produces a very large increase in current, that is to say the incremental impedance of the diode becomes very small.

Where it is desired to use a Zener diode as a voltage regulation device a limiting resistor is placed in series with the diode. The voltage across the diode is therefore maintained relatively constant due to the fact that increases in the applied voltage cause a large increase in the current through the diode. The increase in current causes a relatively large change in voltage across the limiting resistor and permits only a relatively small change in voltage across the diode. If the diode characteristic in Fig. 4 were vertical and followed the dotted line MS then the diode would provide constant voltage regulation in the circuit of Fig. 1. However, it will be noted that an increase in current from the point M to the point S in Fig. 4 causes a slight increase in voltage from the point M to the point R.

It may therefore be concluded that the voltage regulation provided by the diode 24 is not absolutely constant but that slight increases in bias winding current will be produced for increases in line voltage. The incremental impedance of the diode 24 is represented by the slope of line ML. The degree of voltage regulation provided by the diode will be largely controlled by the relationship of this incremental impedance to the total impedance of the other circuit elements including the limiting resistor 22 together with the series resistance of the variable resistor 21 and whatever resistance may be contributed by the forward resistance of the rectifier 23.

The degree of voltage compensation or the slope of the line BD in Fig. 2 may therefore be controlled within limits by adjustment of the variable resistor 21. Obviously the amount of bias current represented by the coordinate of the point B in Fig. 2 will be controlled by adjustment of the bias resistor 19. The bias setting and voltage compensation each may therefore be controlled substantially independently of the other.

The present invention may be incorporated in various types of magnetic amplifiers, and therefore the invention is not limited to the particular amplifier arrangement shown and described. On the contrary, the bias and voltage compensation circuit of the present invention is also applicable to any type of magnetic amplifier for which voltage compensation might be desired.

It will be understood that the resistors shown as variable in the embodiment of the circuit shown in Fig. 1 may sometimes be desired to be fixed, and that where separate resistors have been shown, they may be combined in some cases. Furthermore, while a Zener diode has been described as the non-linear resistance element used for voltage regulation, it will be understood that other equivalent devices could be used for this purpose.

From the foregoing explanation it is obvious that the present bias and voltage compensation circuit presents many advantages. Where an external regulated voltage source is used to provide a constant bias winding current, this source must often be accurately regulated in computer applications, for example, to a value of $10\pm.001$ volts. Obviously a regulated voltage supply to perform this function is both expensive and bulky. The necessity for such a power supply is completely eliminated by the present circuit.

In addition the voltage regulation provided by the Zener characteristics of the diode in the present circuit is particularly advantageous in that the Zener point of ordinary diodes lies in the range of from 3 to 15 volts which is approximately the voltage required in magnetic amplifiers for computer applications. Furthermore, the Zener voltage is relatively independent of temperature so that the necessity for complicated temperature compensation schemes is virtually avoided. The size of the Zener diode added to the magnetic amplifier circuit is so small compared to the size of a power supply as to be practically negligible.

The fact that the present circuit accomplishes the bias and voltage compensation functions with a single winding is of the utmost importance. One of the previously necessary windings of the amplifier is thus rendered unnecessary and hence the complexity and cost of the amplifier is reduced by almost one-sixth.

In addition to the elimination of a winding, one of the three precision resistors previously required is eliminated from the circuit by use of the present invention. This represents substantial saving in design time by avoiding the necessity of calculating or otherwise determining the precise value necessary for these two resistors. The resistance values of the resistors in magnetic amplifiers for computer applications is so critical that substantial production time is consumed in checking these values. Therefore elimination of one-third of such resistors substantially reduces production time.

In addition to the economy and simplification represented by the present invention, it will be observed that a magnetic amplifier incorporating the present invention is a self-contained unit not requiring a voltage-regulated D.C. power supply. Thus all features contributing to the accuracy of the amplifier are built into the amplifier unit itself.

This feature presents an obvious advantage in service and repair, for example, by avoiding inter-independence of units within a computer and thus tending to simplify trouble-shooting, service, and replacement. A computer for example may include a substantial number of magnetic amplifiers and it is therefore highly desirable that a faulty amplifier may be replaced without causing the computer to be disaligned by interaction of a new amplifier with a bias-current power supply, for example. The present invention provides isolated self-sufficient plug-in amplifiers in which all elements contributing to their accuracy are internal. Hence amplifiers incorporating the present invention may be tested individually and if satisfactory must necessarily operate satisfactorily in a multi-amplifier computer circuit.

From the foregoing explanation it will be seen that a bias and voltage regulation circuit is provided by the present invention which may be incorporated in a magnetic amplifier to produce an amplifier having fewer windings, fewer precision resistors, and tending to be less expensive more reliable and more easily maintained.

Many modifications may be made to the particular embodiment of the invention shown without exceeding the scope of the present invention and accordingly the scope of the present invention is not to be deemed limited to the particular embodiment shown but is defined solely by the appended claims.

What is claimed is:

1. In a magnetic amplifier adapted to be energized from an alternating current power supply subject to voltage variations, a combined bias and voltage compensation circuit comprising a winding, a first resistor, a second resistor and a rectifier, means for connecting said winding, said first resistor, said second resistor, and said rectifier in series to receive bias current from said power supply for the magnetic amplifier, and means including a non-linear resistance element having a smaller value of incremental resistance for larger values of current connected in parallel with said winding and said first resistor for modifying said bias current in response to substantial variations in the voltage of said power supply to compensate for said voltage variations.

2. In a magnetic amplifier adapted to be energized from an alternating current power supply subject to voltage variations, a combination bias and voltage compensation circuit comprising a winding, a resistor, and a rectifier, means for connecting said winding, resistor, and rectifier in series to receive bias current from said power supply and a Zener diode connected in parallel with said bias winding for modifying said bias current in response to substantial variations in the voltage of said supply to compensate for said voltage variations.

3. In a magnetic amplifier adapted to be energized from an alternating current power supply subject to voltage variations, a combination bias and voltage compensation circuit comprising a winding, a first variable resistor, a second variable resistor, a fixed resistor and a rectifier, means for connecting said first variable resistor, second variable resistor, fixed resistor and rectifier in series to receive bias current from said supply, and a Zener diode connected in parallel with said bias winding and said first variable resistor for modifying said bias current in response to substantial variations in the voltage of said supply to compensate for said voltage variations.

References Cited in the file of this patent

UNITED STATES PATENTS

| | | |
|---|---|---|
| 2,725,519 | Malick et al. | Nov. 29, 1955 |
| 2,752,510 | Hall | June 26, 1956 |
| 2,760,148 | Sakamoto | Aug. 21, 1956 |
| 2,773,184 | Rolf | Dec. 4, 1956 |

OTHER REFERENCES

Publication: Magnetic Amplifier Circuits, by Wm. A. Geyger; McGraw-Hill Book Co., Inc., New York, 1954, pp. 99–105, 154, 155. Copy in Sci. Lib.